US012807131B2

(12) United States Patent
Patel et al.

(10) Patent No.: US 12,807,131 B2
(45) Date of Patent: Nov. 24, 2026

(54) CONSTRAINED FILTERING APPROACH FOR ESTIMATION OF CLUTCH TORQUE IN A TWO MASS SYSTEM SUCH AS A HYBRID POWERTRAIN

(71) Applicant: FCA US LLC, Auburn Hills, MI (US)

(72) Inventors: Nadirsh Patel, Auburn Hills, MI (US); Abdulquadri Oluwatobi Banuso, Auburn Hills, MI (US); Hangxing Sha, Auburn Hills, MI (US); Cristian Rostiti, Auburn Hills, MI (US); Krishna Madireddy, Auburn Hills, MI (US); Ameya Basutkar, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 51 days.

(21) Appl. No.: 18/910,118

(22) Filed: Oct. 9, 2024

(65) Prior Publication Data

US 2026/0097755 A1 Apr. 9, 2026

(51) Int. Cl.
*B60W 20/40* (2016.01)
*B60W 10/02* (2006.01)

(52) U.S. Cl.
CPC ............ *B60W 20/40* (2013.01); *B60W 10/02* (2013.01); *B60W 2510/0208* (2013.01); *B60W 2710/025* (2013.01); *B60W 2710/027* (2013.01)

(58) Field of Classification Search
CPC ................. B60W 20/40; B60W 10/02; B60W 2510/0208; B60W 2710/025; B60W 2710/027
See application file for complete search history.

(56) References Cited

U.S. PATENT DOCUMENTS

| | | | | |
|---|---|---|---|---|
| 9,714,616 | B2 | 7/2017 | Jin et al. | |
| 10,156,197 | B1 | 12/2018 | Jin et al. | |
| 11,299,142 | B2 | 4/2022 | Akanda et al. | |
| 11,498,566 | B2 | 11/2022 | Chen et al. | |
| 11,995,923 | B2 * | 5/2024 | Shui | B60W 30/188 |
| 2019/0389317 | A1 * | 12/2019 | Oh | B60L 15/20 |
| 2021/0053553 | A1 * | 2/2021 | Akanda | B60W 20/11 |

* cited by examiner

*Primary Examiner* — Toya Pettiegrew
(74) *Attorney, Agent, or Firm* — Jeremy J. Klobucar

(57) ABSTRACT

A clutch torque estimation and control method for vehicle hybrid powertrain includes, in response to detecting a mode transition of the hybrid powertrain that involves a state change of a disconnect clutch arranged between two torque generating systems, initializing a Kalman filter based on a state space model for dynamics of the disconnect clutch, utilizing the Kalman filter to predict estimated speeds and torques for the state change of the disconnect clutch, determining a set of constraints for the state change of the disconnect clutch based on a sign of a slip speed across the disconnect clutch, applying the set of constraints to the predicted estimated speeds and torques to obtain final estimated speeds and torques for the state change of the disconnect clutch, and controlling the disconnect clutch based on the final estimated speeds and torques to improve the mode transition of the hybrid powertrain.

20 Claims, 6 Drawing Sheets

CONSTRAINED FILTERING APPROACH FOR ESTIMATION OF CLUTCH TORQUE IN A TWO MASS SYSTEM SUCH AS A HYBRID POWERTRAIN

FIELD

The present application generally relates to electrified vehicles and, more particularly, to a constrained filtering approach for estimation of clutch torque in a two mass system such as a hybrid powertrain of an electrified vehicle.

BACKGROUND

In two mass systems separated by a clutch, accurately determining the torque transmitted by the clutch is critical to providing fast synchronization and reduced jerk. One example of such a two mass system is a hybrid powertrain having a separation or disconnect clutch arranged between an engine and an electric motor, where the disconnect clutch controls a mode of the hybrid powertrain (e.g., electric or series hybrid). In production, the direct measurement of this disconnect clutch torque is impractical due to the expense of torque sensors and their sensitivity to space constraints and noise. Conventional solutions to estimate the clutch torque utilize heuristic calibration tables for a pressure to torque conversion. These conventional solutions, however, suffer from inaccurate clutch torque estimation, which in turn results in decreased synchronization time and/or increased driveline jerk that are noticeable to a vehicle driver. Accordingly, while these conventional solutions do work for their intended purpose, there exists an opportunity for improvement in the relevant art.

SUMMARY

According to one example aspect of the invention, a clutch torque estimation and control system for hybrid powertrain of a vehicle is presented. In one exemplary implementation, the system comprises a set of sensors configured to monitor a set of operating parameters of the hybrid powertrain, wherein the hybrid powertrain includes a disconnect clutch configured to connect/disconnect two different torque generating systems and a control system configured to detect a mode transition of the hybrid powertrain that involves a state change of the disconnect clutch and, in response to detecting the mode transition, initialize a Kalman filter based on a state space model for dynamics of the disconnect clutch, utilize the Kalman filter to predict estimated speeds and torques for the state change of the disconnect clutch, determine a set of constraints for the state change of the disconnect clutch based on a sign of a slip speed across the disconnect clutch, apply the set of constraints to the predicted estimated speeds and torques to obtain final estimated speeds and torques for the state change of the disconnect clutch, and control the disconnect clutch based on the final estimated speeds and torques to improve the mode transition of the hybrid powertrain.

In some implementations, the set of constraints include minimum and maximum transferrable clutch torques. In some implementations, the control system is further configured to update a gain and covariance matrices of the Kalman filter based on the predicted estimated speeds and torques and the set of constraints. In some implementations, the mode transition is a transition from a hybrid mode where the disconnect clutch is locked closed to an electric only mode where the disconnect clutch is open. In some implementations, the mode transition is a transition from an electric-only mode where the disconnect clutch is open to a hybrid mode where the disconnect clutch is locked closed. In some implementations, the transition from the electric-only mode to the hybrid mode includes actuating the disconnect clutch with a target torque and then holding the target torque while evaluating against a minimum locking threshold until the disconnect clutch is locked closed.

In some implementations, the state space model is a discretized state space model based on a continuous time model. In some implementations, the continuous time model is defined as:

$$\dot{x} = \begin{bmatrix} \dot{N}_c \\ \dot{T}_c \end{bmatrix} = \begin{bmatrix} 0 & -\left(\frac{1}{I_a + I_c} + \frac{1}{I_b}\right) \\ 0 & 1 \end{bmatrix} \begin{bmatrix} N_c \\ T_c \end{bmatrix} + \begin{bmatrix} \frac{1}{I_a + I_c} & \frac{-1}{I_b} \\ 0 & 0 \end{bmatrix} \begin{bmatrix} T_a \\ T_b \end{bmatrix},$$

where $I_a$, $I_b$, and $I_c$ represent moments of inertia of the two torque generating systems and the disconnect clutch, respectively, wherein a measurement model is defined as:

$$y = N_c = \begin{bmatrix} 1 & 0 \end{bmatrix} \begin{bmatrix} N_c \\ T_c \end{bmatrix};$$

and wherein a constraints matrix (d) is defined as:

$$d = \begin{bmatrix} T_{c,max} \\ T_{c,min} \end{bmatrix} = \begin{bmatrix} 0 & 1 \\ 0 & 1 \end{bmatrix} \begin{bmatrix} T_{c,Max} \\ T_{c,Min} \end{bmatrix},$$

where $T_{c,max}$ and $T_{c,min}$ are the maximum and minimum transferrable clutch torques. In some implementations, a first torque generating system of the two torque generating systems is an internal combustion engine on an input-side of the disconnect clutch and a second torque generating system of the two torque generating systems is an electric motor on an output-side of the disconnect clutch.

According to another example aspect of the invention, a clutch torque estimation and control method for hybrid powertrain of a vehicle is presented. In one exemplary implementation, the method comprises monitoring, by a control system of the vehicle and using a set of sensors of the vehicle, a set of operating parameters of the hybrid powertrain, wherein the hybrid powertrain includes a disconnect clutch configured to connect/disconnect two different torque generating systems, detecting, by the control system, a mode transition of the hybrid powertrain that involves a state change of the disconnect clutch, and in response to detecting the mode transition, initializing, by the control system, a Kalman filter based on a state space model for dynamics of the disconnect clutch, utilizing, by the control system, the Kalman filter to predict estimated speeds and torques for the state change of the disconnect clutch, determining, by the control system, a set of constraints for the state change of the disconnect clutch based on a sign of a slip speed across the disconnect clutch, applying, by the control system, the set of constraints to the predicted estimated speeds and torques to obtain final estimated speeds and torques for the state change of the disconnect clutch, and controlling, by the control system, the disconnect clutch based on the final estimated speeds and torques to improve the mode transition of the hybrid powertrain.

In some implementations, the set of constraints include minimum and maximum transferrable clutch torques. In some implementations, the method further comprises updating, by the control system, a gain and covariance matrices of the Kalman filter based on the predicted estimated speeds and torques and the set of constraints. In some implementations, the mode transition is a transition from a hybrid mode where the disconnect clutch is locked closed to an electric only mode where the disconnect clutch is open. In some implementations, the mode transition is a transition from an electric-only mode where the disconnect clutch is open to a hybrid mode where the disconnect clutch is locked closed. In some implementations, the transition from the electric-only mode to the hybrid mode includes actuating the disconnect clutch with a target torque and then holding the target torque while evaluating against a minimum locking threshold until the disconnect clutch is locked closed.

In some implementations, the state space model is a discretized state space model based on a continuous time model. In some implementations, the continuous time model is defined as:

$$\dot{x} = \begin{bmatrix} \dot{N}_c \\ \dot{T}_c \end{bmatrix} = \begin{bmatrix} 0 & -\left(\frac{1}{I_a + I_c} + \frac{1}{I_b}\right) \\ 0 & 1 \end{bmatrix} \begin{bmatrix} N_c \\ T_c \end{bmatrix} + \begin{bmatrix} \frac{1}{I_a + I_c} & \frac{-1}{I_b} \\ 0 & 0 \end{bmatrix} \begin{bmatrix} T_a \\ T_b \end{bmatrix},$$

where $I_a$, $I_b$, and $I_c$ represent moments of inertia of the two torque generating systems and the disconnect clutch, respectively, wherein a measurement model is defined as:

$$y = N_c = [1 \quad 0] \begin{bmatrix} N_c \\ T_c \end{bmatrix};$$

and wherein a constraints matrix (d) is defined as:

$$d = \begin{bmatrix} T_{c,max} \\ T_{c,min} \end{bmatrix} = \begin{bmatrix} 0 & 1 \\ 0 & 1 \end{bmatrix} \begin{bmatrix} T_{c,Max} \\ T_{c,Min} \end{bmatrix},$$

where $T_{c,max}$ and $T_{c,min}$ are the maximum and minimum transferrable clutch torques. In some implementations, a first torque generating system of the two torque generating systems is an internal combustion engine on an input-side of the disconnect clutch and a second torque generating system of the two torque generating systems is an electric motor on an output-side of the disconnect clutch.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, accurately determining the torque transmitted by clutch is critical to providing fast synchronization and reduced jerk in a two mass system, such as a hybrid powertrain having a separation or disconnect clutch arranged between an engine and an electric motor, where the disconnect clutch controls a mode of the hybrid powertrain (e.g., electric or series hybrid). In production, the direct measurement of this disconnect clutch torque is impractical due to the expense of torque sensors and their sensitivity to space constraints and noise. Conventional solutions to estimate the clutch torque utilize heuristic calibration tables for a pressure to torque conversion. Such solutions require a high calibration effort and several conditions and rules might be needed to estimate a sufficiently accurate clutch torque for all working conditions. These conventional solutions also do not consider the non-linearities of the clutch with respect to the sign of its clutch torque and its friction characteristics, which results in inaccurate clutch torque estimation and, in turn, decreased synchronization time and/or increased driveline jerk that are noticeable to a vehicle driver. Thus, while these conventional solutions do work for their intended purpose, there exists an opportunity for improvement in the relevant art.

Figure 1A:
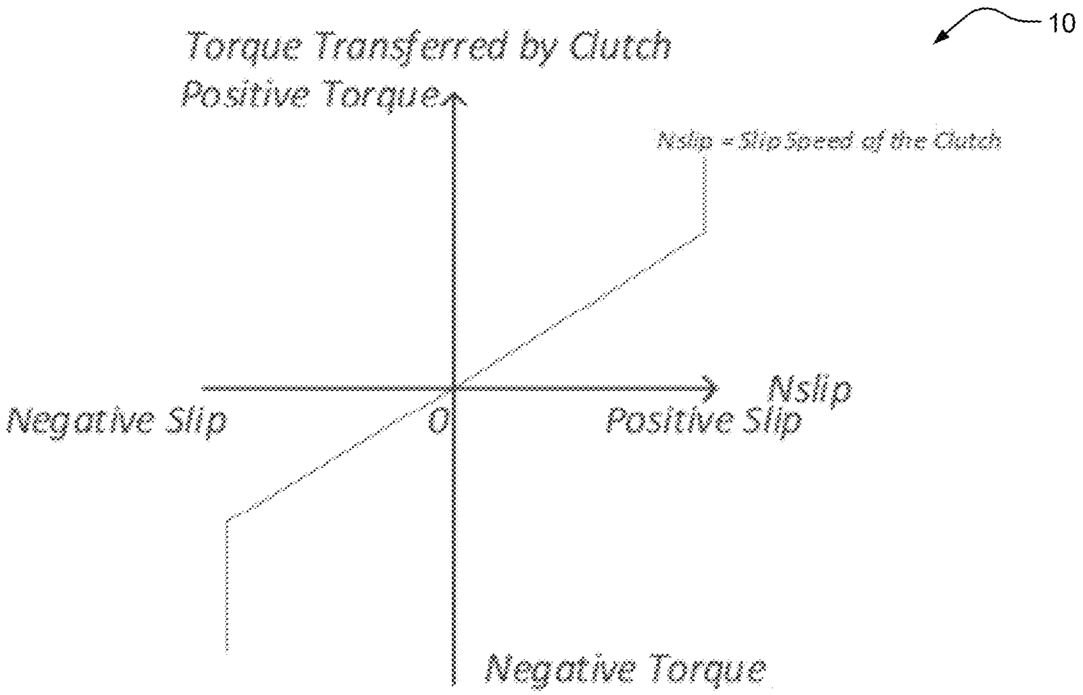
FIGS. 1A-1B are diagrams depicting an example friction clutch torque model and an example two mass system including a separation clutch according to the principles of the present application.
Figure 1B:
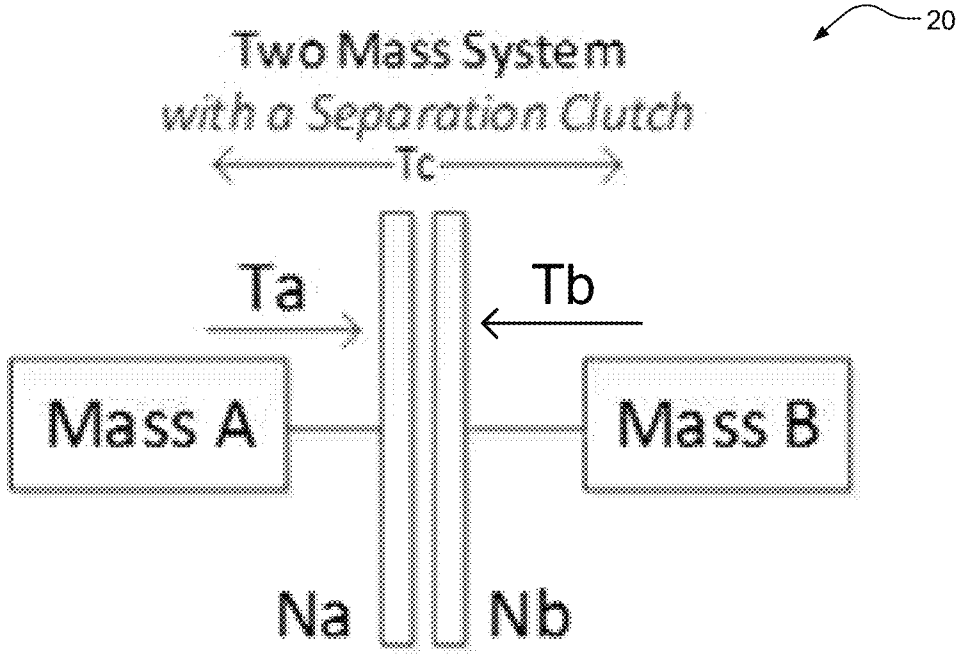

Accordingly, a new constrained filtering (e.g., Kalman filtering) approach for estimating clutch torque in a two mass system, such as a hybrid powertrain, is presented herein. This technique involves modeling the mass of the input/output components and the separation or disconnect clutch itself and it considers the non-linear behavior of the clutch when there is a difference between in speed between the input and output (also known as "slip speed"). The slip speed information is important because it affects the amount of torque that can be transferred through the clutch. The direction of the slip speed also changes the characteristics of the torque transfer. FIG. 1A depicts an example diagram 10 illustrating how the magnitude and constraints on the transferred clutch torque varies depending on whether the slip speed is positive or negative. By redefining the clutch torque estimation problem as a constrained filtering problem, the non-linearities of the clutch with respect to the direction of the slip speed can be incorporated. This includes creating a unique observer structure where the state equations of the clutch slip speed dynamics model with the measurement function being the function of the slip speed across the clutch from the left hand side to the right side, and augmented constraints matrix to illustrate the sign of the clutch, within the filter structure. FIG. 1B depicts an example diagram 20 of a two mass system having a separation clutch therebetween.

In the diagram 20, a first mass A is acting on the clutch and a second mass B is acting against the clutch. This two mass system is used to determine the observer filter structure that is described in greater detail herein. In the diagram 20, $T_a$ represents the torque of mass A acting on the clutch, $T_b$ represents the torque of mass B acting against the clutch, and $T_c$ represents the transferred torque across the clutch, and Na, Nb, and Nc represent the speeds of mass A, mass B, and the clutch slip, respectively. The filter structure is based on the following continuous system time model:

$$\dot{x} = \begin{bmatrix} \dot{N}_c \\ \dot{T}_c \end{bmatrix} = \begin{bmatrix} 0 & -\left(\frac{1}{I_a + I_c} + \frac{1}{I_b}\right) \\ 0 & 1 \end{bmatrix} \begin{bmatrix} N_c \\ T_c \end{bmatrix} + \begin{bmatrix} \frac{1}{I_a + I_c} & \frac{-1}{I_b} \\ 0 & 0 \end{bmatrix} \begin{bmatrix} T_a \\ T_b \end{bmatrix}, \quad (1)$$

where $I_a$, $I_b$, and $I_c$ represent the moments of inertia of mass A, mass B, and the clutch, respectively. The measurement model can be defined as:

$$y = N_c = [1 \quad 0] \begin{bmatrix} N_c \\ T_c \end{bmatrix}, \quad (2)$$

and the constraints matrix (d) can be defined as follows:

$$d = \begin{bmatrix} T_{c,max} \\ T_{c,min} \end{bmatrix} = \begin{bmatrix} 0 & 1 \\ 0 & 1 \end{bmatrix} \begin{bmatrix} T_{c,Max} \\ T_{c,Min} \end{bmatrix}, \quad (3)$$

where $T_{c,max}$ and $T_{c,min}$ are maximum and minimum transferrable clutch torques based on slip speeds and the specified clutch characteristics:

$$T_{c,max} = \begin{bmatrix} 0, \text{ when slip speed} < 0 \\ \text{maximum postive clutch torque, when slip speed} > 0 \end{bmatrix}, \text{ and}$$

$$T_{c,min} = \begin{bmatrix} \text{minimum negative clutch torque, when slip speed} < 0 \\ 0, \text{ when slip speed} > 0 \end{bmatrix}.$$

Using this formulation, a novel solution is proposed where the estimation structure directly incorporates the knowledge of the slip speed and clutch torque limits to estimate the transferred clutch torque. In one exemplary implementation, constrained Kalman filtering is the proposed algorithm which generates the clutch torque estimates using the algorithm presented in FIG. 3A and as discussed in greater detail below by incorporating the clutch slip speed dynamics above, friction clutch torque constraints model withing the filtering structure. One benefit of the techniques of the present application compared to the conventional heuristic type techniques include decreased calibration costs. For the customer, potential benefits include increased drivability performance coupled with decreased emission and fuel consumption. While described with respect to a series hybrid powertrain, this solution is applicable to multiple powertrains with clutches and controllers that need to accurately estimate the transferred clutch torque as accurate clutch torque estimation is crucial in a torque management system for vehicles. It allows for more precise control of the clutch engagement, leading to smoother acceleration and gear shifts. This not only enhances the driving experience by making it more responsive and enjoyable but also contributes to environmental sustainability. Improved drivability performance is achieved without compromising on efficiency, as precise torque management can lead to reductions in both emissions and fuel consumption.

Figure 2:
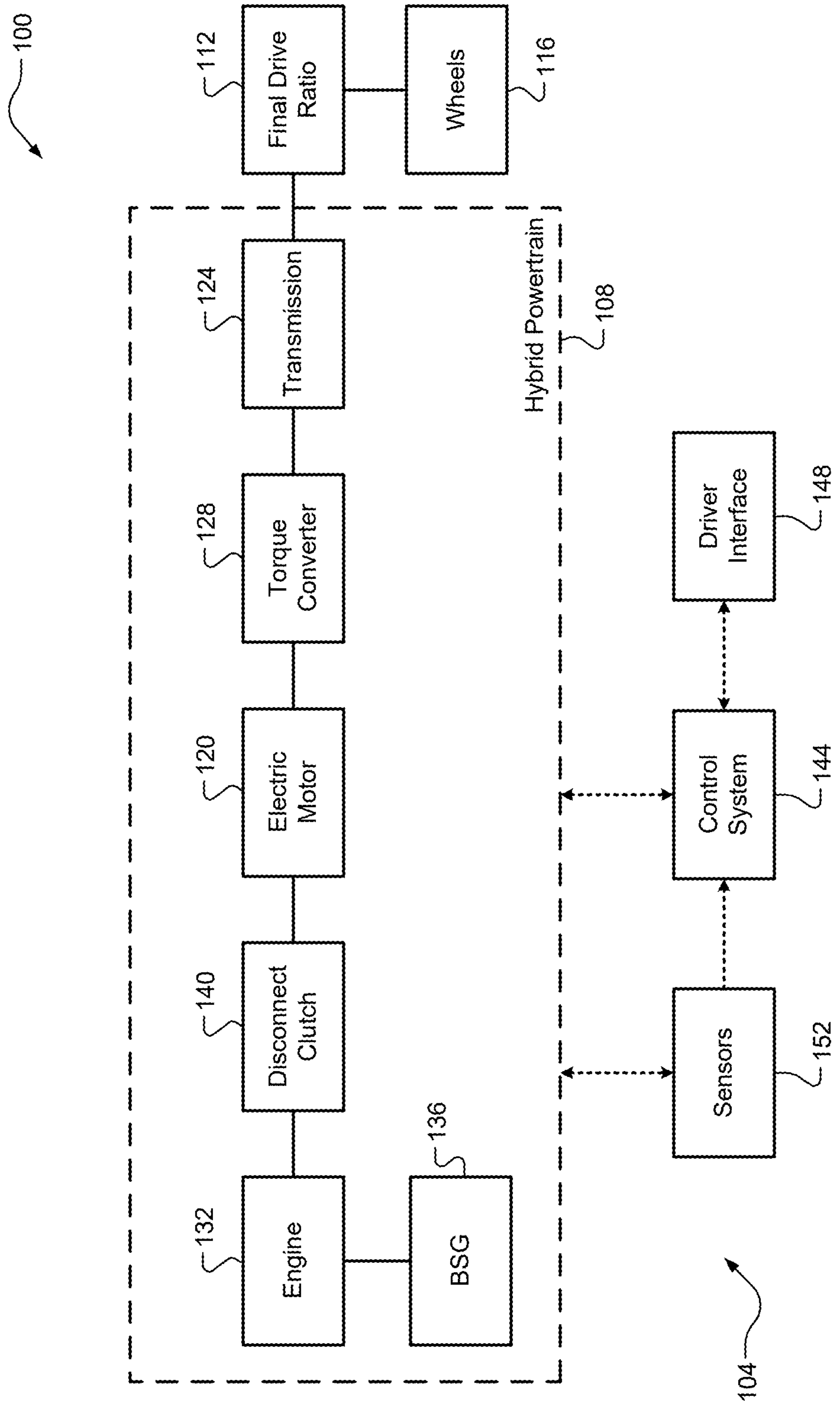
FIG. 2 is a functional block diagram depicting an example hybrid powertrain and an example clutch torque estimation and control system according to the principles of the present application.

Referring now to FIG. 2, a functional block diagram of an example hybrid powertrain 108 of an electrified vehicle 100 that also includes an example clutch torque estimation and control system 104 according to the principles of the present application is illustrated. The hybrid powertrain 108 (also "electrified powertrain 108" or "powertrain 108") is configured to generate and transfer drive torque to a driveline (e.g., a final drive ratio 112 and wheels 116) for propulsion. As shown, the powertrain 108 includes an electric motor 120 (e.g., a three-phase traction motor) connected to a transmission 124 (a multi-speed step gear transmission, a continuously variable transmission, etc.) with the torque converter 128 (e.g., a fluid coupling) arranged therebetween. The powertrain 108 further includes an internal combustion engine 132 having a belt-driven starter-generator (BSG) system 136 coupled thereto (e.g., for engine stop-start control) with a separation or disconnect clutch 140 arranged between the electric motor 120 and the engine 132. A controller or control system 144 controls operation of the powertrain 108, which primarily includes controlling the powertrain 108 to generate a desired amount of drive torque to satisfy a driver torque request (e.g., received via a driver interface 148, such as an accelerator pedal). The control system 144 also receives measured operating parameters, such as speeds of the various shafts of the powertrain 108, as well as other suitable parameters (pressures, temperatures, etc.) and states of various devices (clutches, the transmission 124, etc.) as monitored/measured by a set of sensors 152. The clutch estimation and control system 104, which primarily includes the control system 144 and the sensors 152, is configured to perform the clutch torque estimation and control techniques of the present application.

Figure 3A:
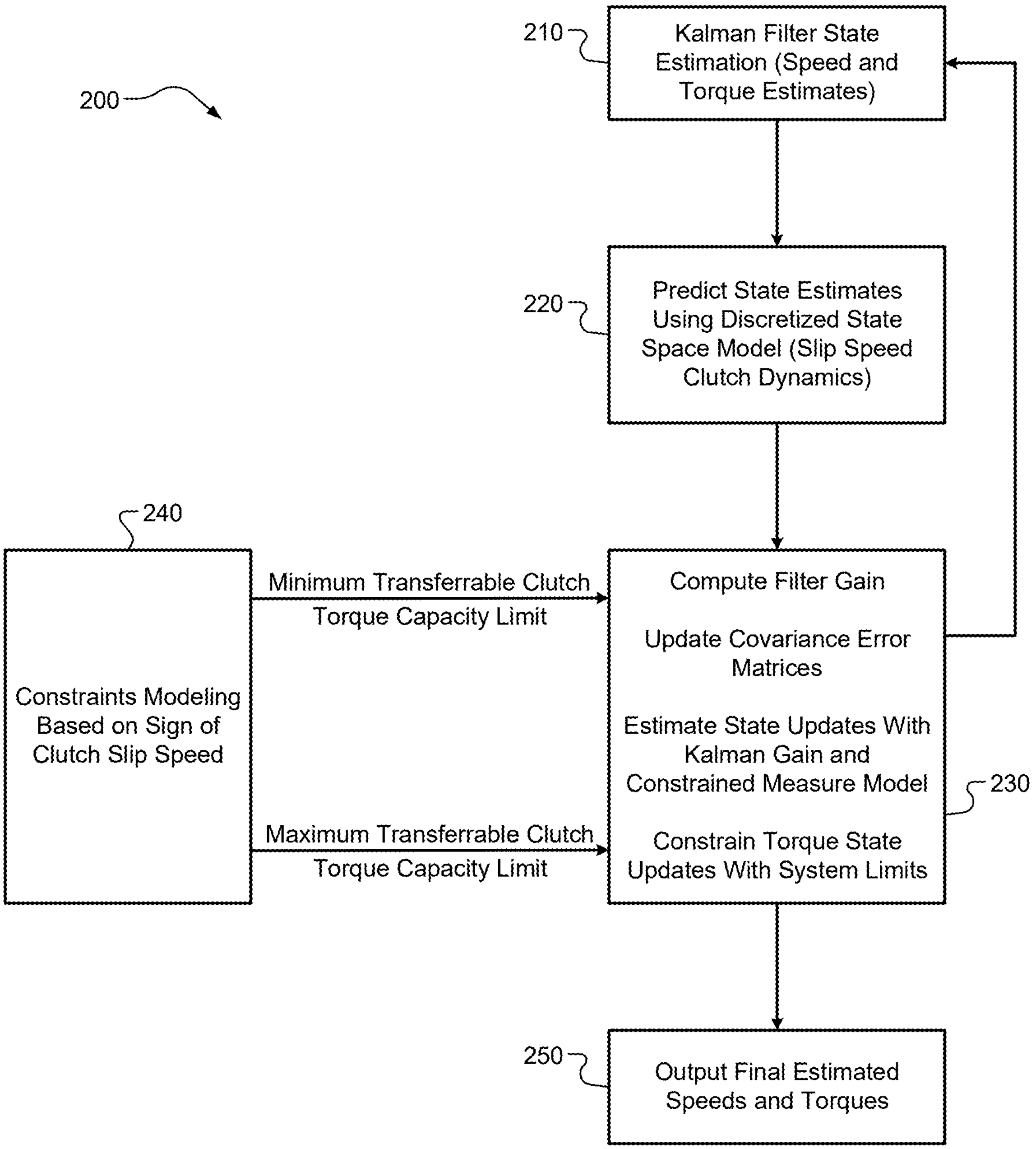
FIGS. 3A-3B are functional block diagram depicting example system architectures for the clutch torque estimation and control system according to the principles of the present application.
Figure 3B:
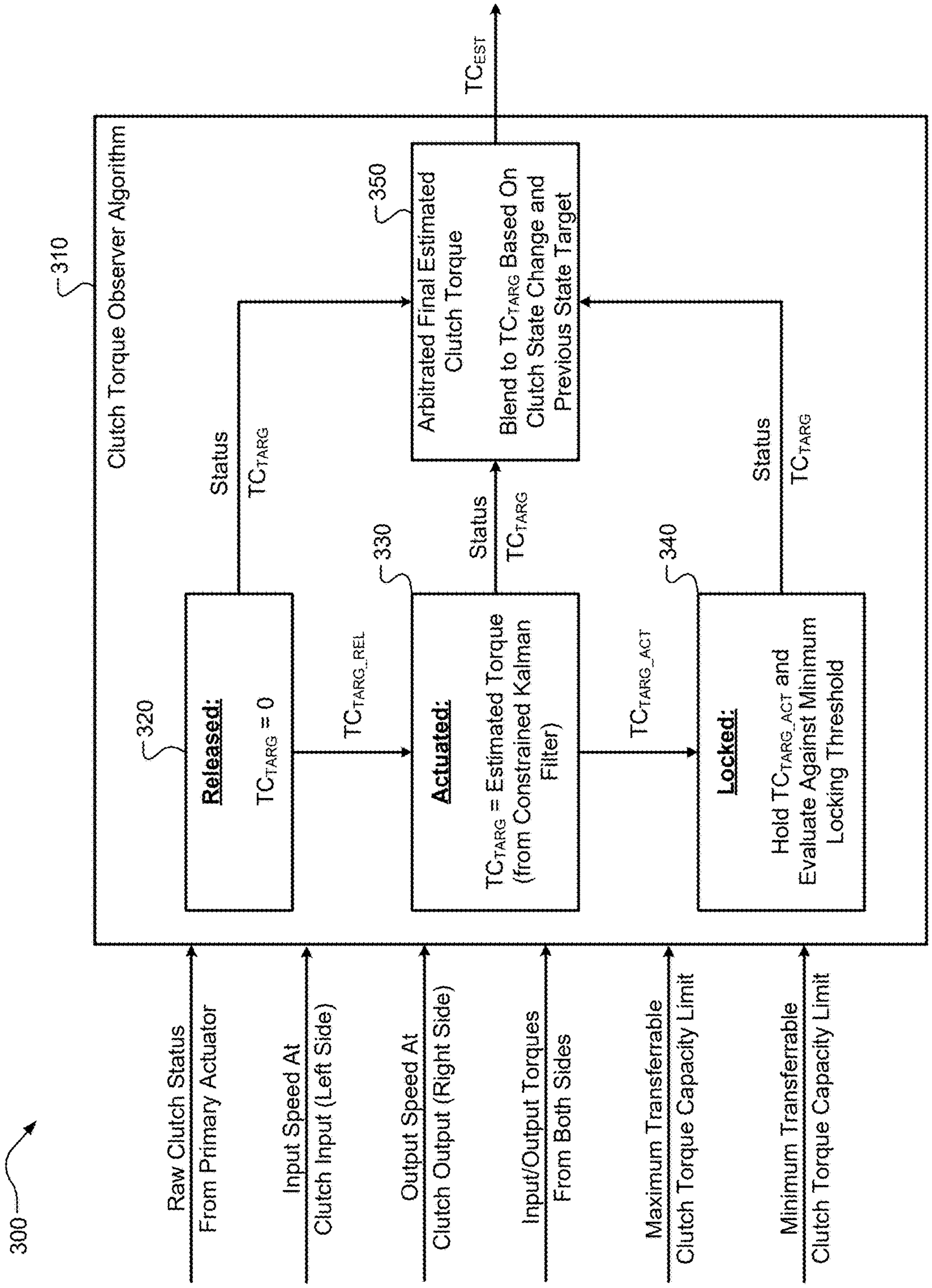
Figure 4:
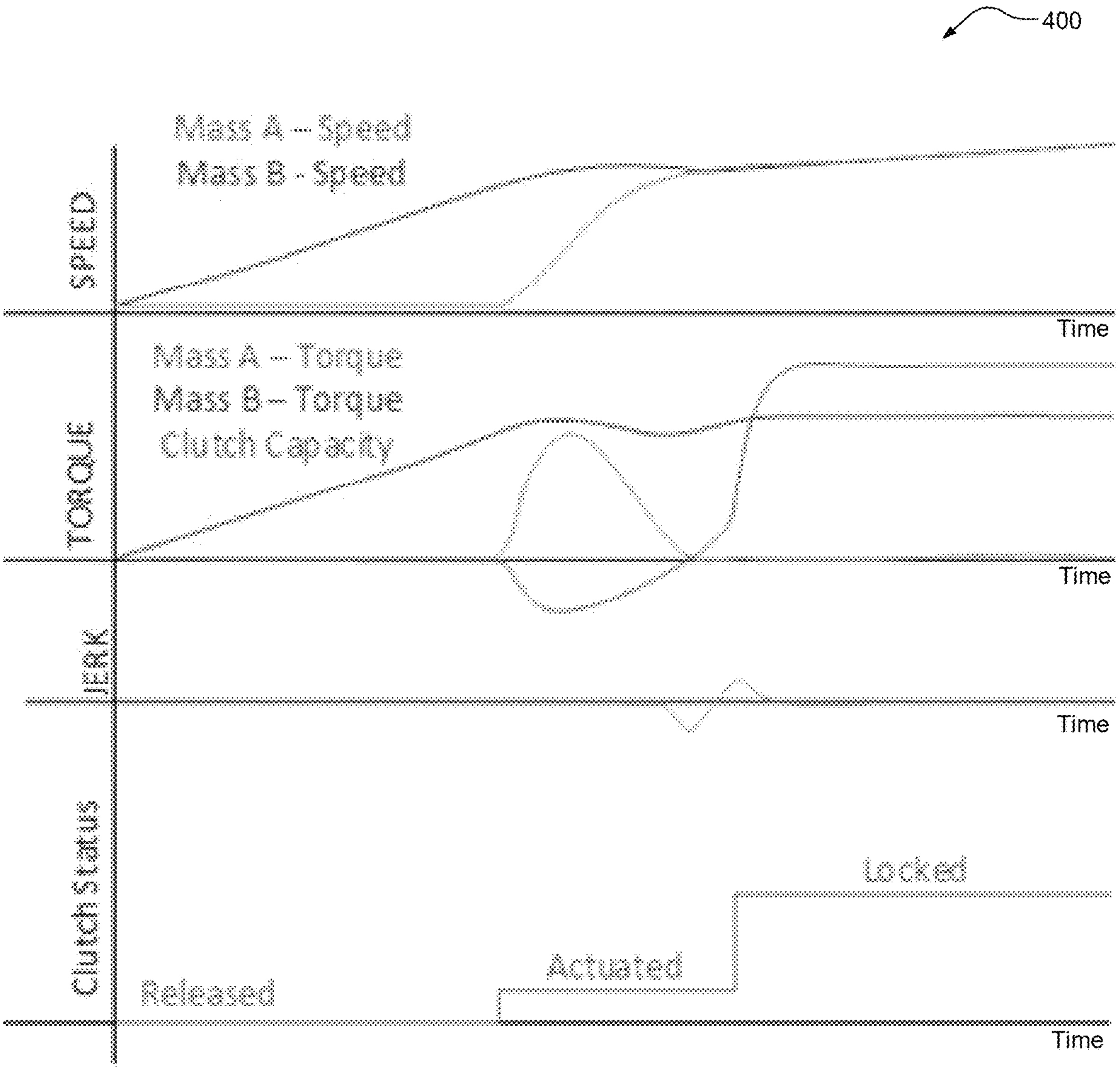
FIG. 4 is a plot depicting an example use case of the clutch torque estimation and control system in a hybrid powertrain according to the principles of the present application.

Referring now to FIGS. 3A-3B and FIG. 4, functional block diagrams of example system architectures 200, 300 and a plot of an example use case 400 of the clutch torque estimation and control system 104 according to the principles of the present application are illustrated. In system 200 of FIG. 3A, at 210 a Kalam filter is initialized at the state estimates (e.g., speeds and torques) from a previous time step that includes a corresponding covariance and previous state estimates (see 230). At 220, the Kalman filter is utilized to predict the state estimates using a discretized state space model of slip speed clutch dynamics. At 230, four operations are performed. First, a filter gain for the Kalman filter is computed. Second, the corresponding error covariance matrices are updated. Third, state updates are estimated with the corresponding Kalman filter gain and the constrained measurement model. Lastly, the torque state estimations are constrained with system limits, which are determined and provided by block 240. At 240, the constraints (i.e., maximum/minimum transferrable clutch torque capacity limits) are modeled based on the sign of the clutch slip speed. The estimated state updates and covariance matrices are returned to block 210, and the constrained torque state estimations are output as the final estimated speed and torque estimates for the clutch at 250. As mentioned above, the plot 400 of FIG. 4 illustrates the operation of the clutch torque estimation and control process.

In system 300 of FIG. 3B, an example clutch torque observer algorithm 310 is illustrated. The illustrated state flow shows a sequence of a clutch closings with the estimation strategy. The transitions between the states are defined as follows. Beginning at 320 is a transition from a Released state to an Actuated state—the transition from released to actuated occurs when the clutch status goes to actuated state. Here, the target estimated clutch torque ($TC_{TARG}$) is zero leading into the actuated state. At 330, in the Actuated state, the estimated clutch torque is from the constrained filter algorithm. From 330 is a transition from the Actuated state to a Locked state 340. The transition between the actuated to locked state occurs based on the following conditions: (i) when the absolute value of the slip speed of the clutch is less than a calibratable threshold, (ii) when the absolute value of the clutch slip speed acceleration or rate of change is less than a calibratable threshold, and (iii) when the estimated clutch torque $TC_{TARG}$ IS greater than the minimum locking threshold of the clutch characteristics and greater than the input torque from the mass A (e.g., the engine 132) from its input. When all of these conditions are true or satisfied, the clutch status goes to Locked. A similar such algorithm for the reverse case of a clutch opening is also defined where, the transition occurs from the Locked to the Actuated state to the Released state, is also considered and applicable herein. At 350, the final estimated clutch torque (TEST) is arbitrated based on the clutch status or state change and the previous state target $TC_{TARG}$.

Figure 5:
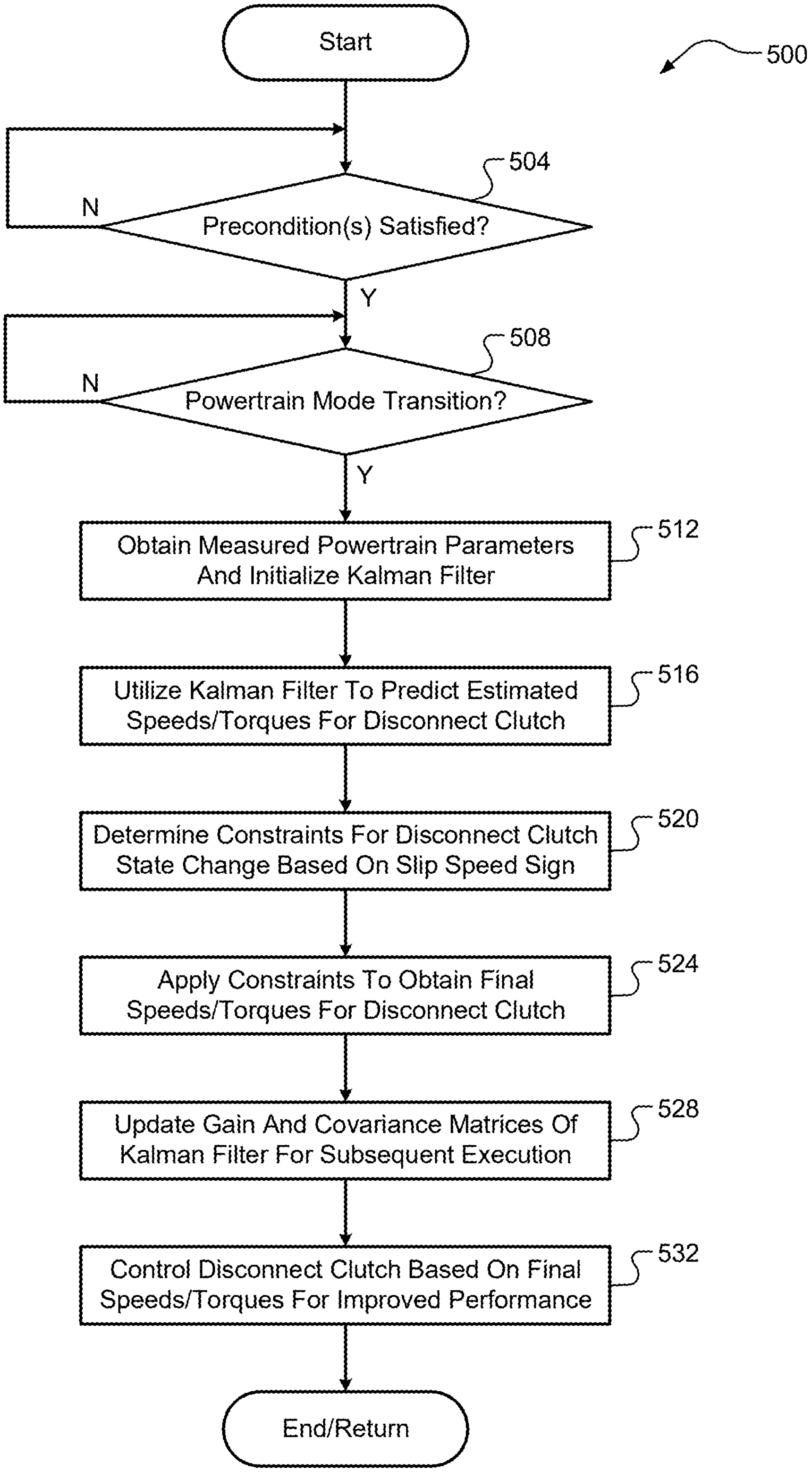
FIG. 5 is a flow diagram depicting an example clutch torque estimation and control method for a hybrid powertrain of a vehicle according to the principles of the present application.

Referring now to FIG. 5, a flow diagram depicting an example clutch torque estimation and control method 500 for hybrid powertrain of a vehicle according to the principles of the present application is illustrated. While the powertrain 108 and its components are specifically referenced for descriptive/illustrative purposes, it will be appreciated that the method 500 could be applicable to any suitable configured powertrain or other two mass system having a separation or disconnect clutch. The method 500 begins at optional 504 where it is determined whether one or more optional preconditions are satisfied. These precondition(s) could include, for example only, the vehicle 100 being powered up and the powertrain 108 being operational and there being no malfunctions or faults present that would negatively affect or otherwise impact the operation of the techniques of the present application. In one exemplary implementation, one of the precondition(s) could be the hybrid powertrain requiring a mode transition (electric-only to hybrid, hybrid to electric-only, etc.) where the clutch 140 needs to be released or actuated/locked. When false, the method 500 ends or returns to 504. When true, the method 500 proceeds to 508. In other implementations, this mode transition detection could be performed separately at 508 as shown and, when detected, the method 500 proceeds to 512.

At 512, the control system 144 obtains (e.g., using the sensors 152) a set of operating parameters of the hybrid powertrain 108 (e.g., speeds) and initializes a Kalman filter based on a state space model for dynamics of the disconnect clutch 140. At 516, the control system 144 utilizes the Kalman filter to predict estimated speeds and torques for the state change of the disconnect clutch 140. At 520, the control system 144 determines a set of constraints for the state change of the disconnect clutch 140 (e.g., minimum/maximum transferrable clutch torques) based on a sign of a slip speed across the disconnect clutch 140. At 524, the control system 144 applies the set of constraints to the predicted estimated speeds and torques to obtain final estimated speeds and torques for the state change of the disconnect clutch. At 528, the control system 144 determines updates for a gain and covariance matrices of the Kalman filter for subsequent executions. At 532, the control system 144 controls the disconnect clutch 140 based on the final estimated speeds and torques to improve the mode transition of the hybrid powertrain 108. As previously discussed, this could include faster synchronization and/or reduced jerk.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A clutch torque estimation and control system for a hybrid powertrain of a vehicle, the system comprising:

a set of sensors configured to monitor a set of operating parameters of the hybrid powertrain, wherein the hybrid powertrain includes a disconnect clutch configured to connect/disconnect two different torque generating systems; and a control system configured to detect a mode transition of the hybrid powertrain that involves a state change of the disconnect clutch and, in response to detecting the mode transition:

initialize a Kalman filter based on a state space model for dynamics of the disconnect clutch;

utilize the Kalman filter to predict estimated speeds and torques for the state change of the disconnect clutch;

determine a set of constraints for the state change of the disconnect clutch based on a sign of a slip speed across the disconnect clutch;

apply the set of constraints to the predicted estimated speeds and torques to obtain final estimated speeds and torques for the state change of the disconnect clutch; and control the disconnect clutch based on the final estimated speeds and torques to improve the mode transition of the hybrid powertrain.

2. The system of claim 1, wherein the set of constraints include minimum and maximum transferrable clutch torques.

3. The system of claim 2, wherein the control system is further configured to update gain and covariance matrices of the Kalman filter based on the predicted estimated speeds and torques and the set of constraints.

4. The system of claim 2, wherein the mode transition is a transition from a hybrid mode where the disconnect clutch is locked closed to an electric only mode where the disconnect clutch is open.

5. The system of claim 2, wherein the mode transition is a transition from an electric-only mode where the disconnect clutch is open to a hybrid mode where the disconnect clutch is locked closed.

6. The system of claim 5, wherein the transition from the electric-only mode to the hybrid mode includes actuating the disconnect clutch with a target torque and then holding the target torque while evaluating against a minimum locking threshold until the disconnect clutch is locked closed.

7. The system of claim 2, wherein the state space model is a discretized state space model based on a continuous time model.

8. The system of claim 7, wherein the continuous time model is defined as:

$$\dot{x} = \begin{bmatrix} \dot{N}_c \\ \dot{T}_c \end{bmatrix} = \begin{bmatrix} 0 & -\left(\frac{1}{I_a + I_c} + \frac{1}{I_b}\right) \\ 0 & 1 \end{bmatrix} \begin{bmatrix} N_c \\ T_c \end{bmatrix} + \begin{bmatrix} \frac{1}{I_a + I_c} & \frac{-1}{I_b} \\ 0 & 0 \end{bmatrix} \begin{bmatrix} T_a \\ T_b \end{bmatrix},$$

where $I_a$, $I_b$, and $I_c$ represent moments of inertia of the two torque generating systems and the disconnect clutch, respectively;

wherein a measurement model is defined as:

$$y = N_c = [1 \quad 0] \begin{bmatrix} N_c \\ T_c \end{bmatrix};$$

and wherein a constraints matrix (d) is defined as:

$$d = \begin{bmatrix} T_{c,max} \\ T_{c,min} \end{bmatrix} = \begin{bmatrix} 0 & 1 \\ 0 & 1 \end{bmatrix} \begin{bmatrix} T_{c,Max} \\ T_{c,Min} \end{bmatrix},$$

where $T_{c,max}$ and $T_{c,min}$ are the maximum and minimum transferrable clutch torques.

9. The system of claim 8, wherein a first torque generating system of the two torque generating systems is an internal combustion engine on an input-side of the disconnect clutch and a second torque generating system of the two torque generating systems is an electric motor on an output-side of the disconnect clutch.

10. A clutch torque estimation and control method for a hybrid powertrain of a vehicle, the method comprising:

monitoring, by a control system of the vehicle and using a set of sensors of the vehicle, a set of operating parameters of the hybrid powertrain, wherein the hybrid powertrain includes a disconnect clutch configured to connect/disconnect two different torque generating systems;

detecting, by the control system, a mode transition of the hybrid powertrain that involves a state change of the disconnect clutch; and in response to detecting the mode transition:

initializing, by the control system, a Kalman filter based on a state space model for dynamics of the disconnect clutch;

utilizing, by the control system, the Kalman filter to predict estimated speeds and torques for the state change of the disconnect clutch;

determining, by the control system, a set of constraints for the state change of the disconnect clutch based on a sign of a slip speed across the disconnect clutch;

applying, by the control system, the set of constraints to the predicted estimated speeds and torques to obtain final estimated speeds and torques for the state change of the disconnect clutch; and controlling, by the control system, the disconnect clutch based on the final estimated speeds and torques to improve the mode transition of the hybrid powertrain.

11. The method of claim 10, wherein the set of constraints include minimum and maximum transferrable clutch torques.

12. The method of claim 11, further comprising updating, by the control system, gain and covariance matrices of the Kalman filter based on the predicted estimated speeds and torques and the set of constraints.

13. The method of claim 11, wherein the mode transition is a transition from a hybrid mode where the disconnect clutch is locked closed to an electric only mode where the disconnect clutch is open.

14. The method of claim 11, wherein the mode transition is a transition from an electric-only mode where the disconnect clutch is open to a hybrid mode where the disconnect clutch is locked closed.

15. The method of claim 14, wherein the transition from the electric-only mode to the hybrid mode includes actuating the disconnect clutch with a target torque and then holding the target torque while evaluating against a minimum locking threshold until the disconnect clutch is locked closed.

16. The method of claim 11, wherein the state space model is a discretized state space model based on a continuous time model.

17. The method of claim 16, wherein the continuous time model is defined as:

$$\dot{x} = \begin{bmatrix} \dot{N}_c \\ \dot{T}_c \end{bmatrix} = \begin{bmatrix} 0 & -\left(\frac{1}{I_a + I_c} + \frac{1}{I_b}\right) \\ 0 & 1 \end{bmatrix} \begin{bmatrix} N_c \\ T_c \end{bmatrix} + \begin{bmatrix} \frac{1}{I_a + I_c} & \frac{-1}{I_b} \\ 0 & 0 \end{bmatrix} \begin{bmatrix} T_a \\ T_b \end{bmatrix},$$

where $I_a$, $I_b$, and $I_c$ represent moments of inertia of the two torque generating systems and the disconnect clutch, respectively;

wherein a measurement model is defined as:

$$y = N_c = [1 \quad 0] \begin{bmatrix} N_c \\ T_c \end{bmatrix};$$

and wherein a constraints matrix (d) is defined as:

$$d = \begin{bmatrix} T_{c,max} \\ T_{c,min} \end{bmatrix} = \begin{bmatrix} 0 & 1 \\ 0 & 1 \end{bmatrix} \begin{bmatrix} T_{c,Max} \\ T_{c,Min} \end{bmatrix},$$

where $T_{c,max}$ and $T_{c,min}$ are the maximum and minimum transferrable clutch torques.

18. The method of claim 17, wherein a first torque generating system of the two torque generating systems is an internal combustion engine on an input-side of the disconnect clutch and a second torque generating system of the two torque generating systems is an electric motor on an output-side of the disconnect clutch.

19. The system of claim 8, wherein the control system is configured to determine the set of constraints based on the sign of the slip speed of the disconnect clutch as follows:

when the slip speed is less than zero and sign of the slip speed is negative, $T_{c,max}$ equals zero and $T_{c,min}$ equals a minimum negative clutch torque for the disconnect clutch, and when the slip speed is greater than zero and the sign of the slip speed is positive, $T_{c,max}$ equals a maximum positive clutch torque for the disconnect clutch and $T_{c,min}$ equals zero.

20. The method of claim 17, wherein the control system is configured to determine the set of constraints based on the sign of the slip speed of the disconnect clutch as follows:

when the slip speed is less than zero and sign of the slip speed is negative, $T_{c,max}$ equals zero and $T_{c,min}$ equals a minimum negative clutch torque for the disconnect clutch, and when the slip speed is greater than zero and the sign of the slip speed is positive, $T_{c,max}$ equals a maximum positive clutch torque for the disconnect clutch and $T_{c,min}$ equals zero.

* * * * *